Dec. 13, 1927.
R. G. STANDERWICK
SUSPENSION OF PISTONS AND THE LIKE
Filed Aug. 18, 1924
1,652,879
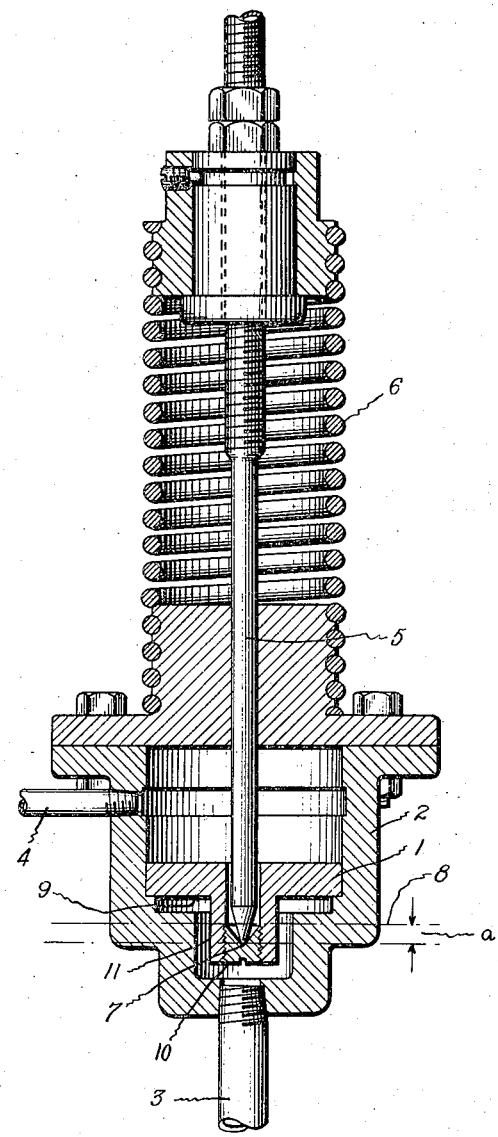
Inventor
Reginald G. Standerwick
by
His Attorney Patented Dec. 13, 1927.

1,652,879

UNITED STATES PATENT OFFICE.

REGINALD G. STANDERWICK, OF MARBLEHEAD, MASSACHUSETTS, ASSIGNOR TO GENERAL ELECTRIC COMPANY, A CORPORATION OF NEW YORK.

SUSPENSION OF PISTONS AND THE LIKE.

Application filed August 18, 1924. Serial No. 732,761.

The present invention relates to fluid pressure actuated devices such as pistons and the like and particularly to the suspension of the movable element of the device on the rod or stem through which movements of the element is transmitted.

The object of the invention is to provide an improved suspension of the above-referred to character and for a consideration of what I believe to be novel and my invention, attention is directed to the accompanying description and the claims appended thereto.

In the drawing, the figure is a vertical, sectional view of a construction embodying my invention.

Referring to the drawing 1 indicates a movable element, here shown in the form of a piston which moves in a cylinder 2. Fluid pressure for moving element 1 is supplied to cylinder 2 through a pipe 3, fluid leaking past the piston being drained away by a pipe 4. Movement of piston 1 is transmitted to any suitable point by a rod or stem 5, which in the present instance is shown as being held by a spring 6.

My invention relates particularly to the connection between the movable element and the rod or stem 5.

According to my invention, I connect the movable element to the rod or stem or suspend it thereon in such manner that the point of load application between the movable element and the rod or stem is in advance of the resultant plane of application of the fluid pressure to the movable element as regards the direction of the load pressure. Or, otherwise expressed, the resultant plane of application of the fluid pressure to the movable element is beyond the point of load application between the movable element and the rod or stem as regards the direction in which the movable element is moved by the fluid pressure. It will be understood that the resultant plane is that plane which is between the pressure planes at distances inversely proportional to their areas.

By this means the result is obtained that the movable element is in a state of stable equilibrium and will always retain its given position without guides.

Referring now particularly to the embodiment of the invention illustrated in the drawing, the point of load application between the movable element 1 and the rod or stem 5 is at 7 and the resultant plane of application of the fluid pressure to the movable element is indicated by the dotted line 8, this being the resultant plane of the two piston surfaces 9 and 10. Point 7 is chosen or located so that it is in advance of plane 8 as regards the direction in which the piston is moved by the fluid pressure. This may be accomplished by providing movable element 1 with a projection 11 in which is a seat for stem 5 located at the point 7, the areas of the surfaces 9 and 10 being such that the resultant plane 8 is beyond the point 7 as regards the direction in which the piston is moved by the fluid pressure. The distance between the point 7 and the plane 8 is indicated by the distance $a$.

By this means the resultant plane of application of fluid pressure to piston 1 is beyond point 7 as regards the direction of pressure which means that the fluid pressure has no tendency to tilt the piston sidewise on its support on stem 5. Hence there will be no binding action of the piston in the cylinder. As a result the piston can move more freely and is subject to much less wear because of the reduction in friction.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:—

1. In a fluid-actuated structure, the combination of a movable abutment to which fluid pressure is applied to effect movement thereof, and means against which the abutment pushes for transmitting said movement, the point of contact between said abutment and said means being so located with respect to the surface area presented to the fluid pressure as to produce a condition equivalent to establishing a common resultant plane which is beyond said point of contact as regards the direction in which the movable abutment is moved by the fluid pressure.

2. A fluid-actuated structure comprising a cylinder, a piston which moves therein, a rod against which the piston pushes for transmitting movement of the piston, and means for effecting the application of pressure to the piston, characterized by the fact that the point of contact between the piston and the rod is so located with respect to the surface area presented by the piston to the fluid pressure as to produce a condition equivalent to establishing a common resultant plane which is beyond said point of contact as regards the direction in which the piston is moved by the fluid pressure.

3. A fluid-actuated structure comprising a cylinder, a piston therein to which fluid pressure is applied, and a rod against which the piston pushes and through which motion of the piston is transmitted, the point of load application between the piston and the rod being so located with reference to the surface area presented by the piston to the fluid pressure as to produce a condition equivalent to establishing a common resultant plane which is beyond said point of load application as regards the direction in which the piston is moved by the fluid pressure.

In witness whereof, I have hereunto set my hand this 15th day of August, 1924.

REGINALD G. STANDERWICK.